Oct. 11, 1966 K. E. BELKNAP 3,277,516
FOWL TENDON PULLING MACHINE
Filed Nov. 4, 1964 2 Sheets-Sheet 1
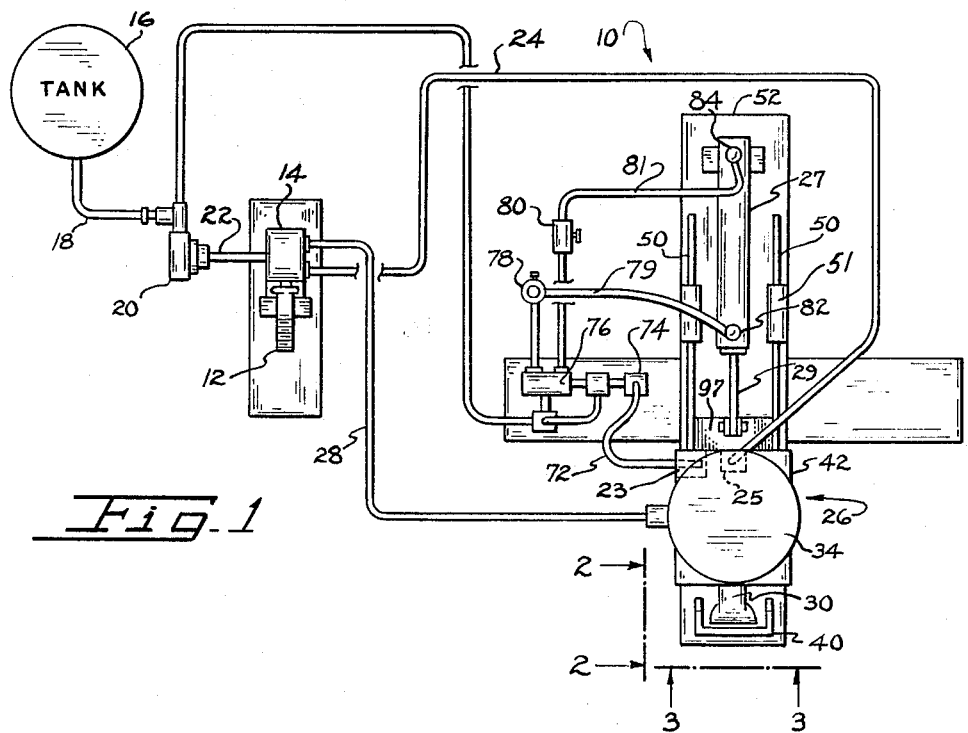
Fig. 1
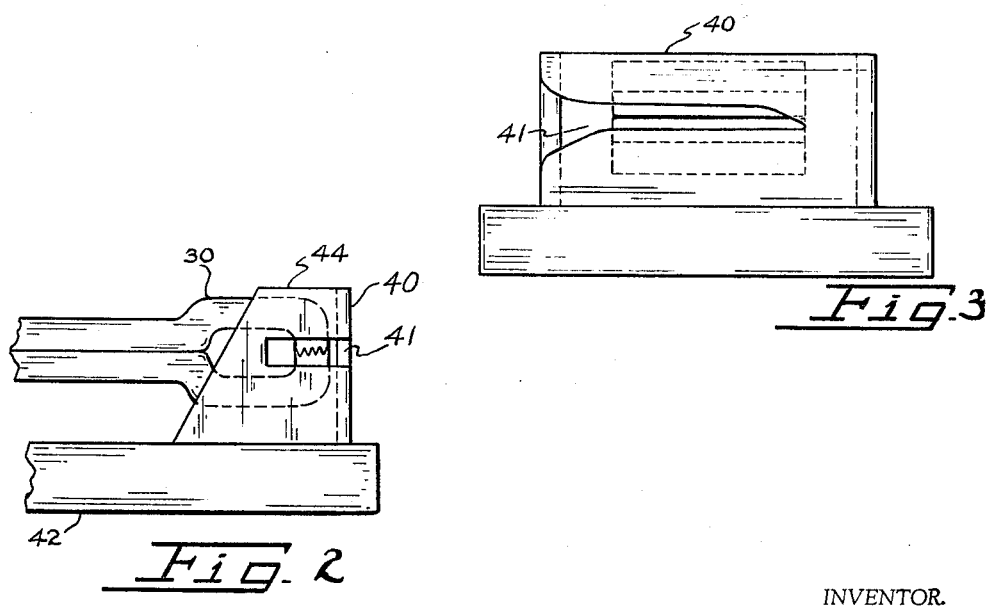
Fig. 2
Fig. 3
INVENTOR.
KENNETH E. BELKNAP
BY
Townsend and Townsend
ATTORNEYS

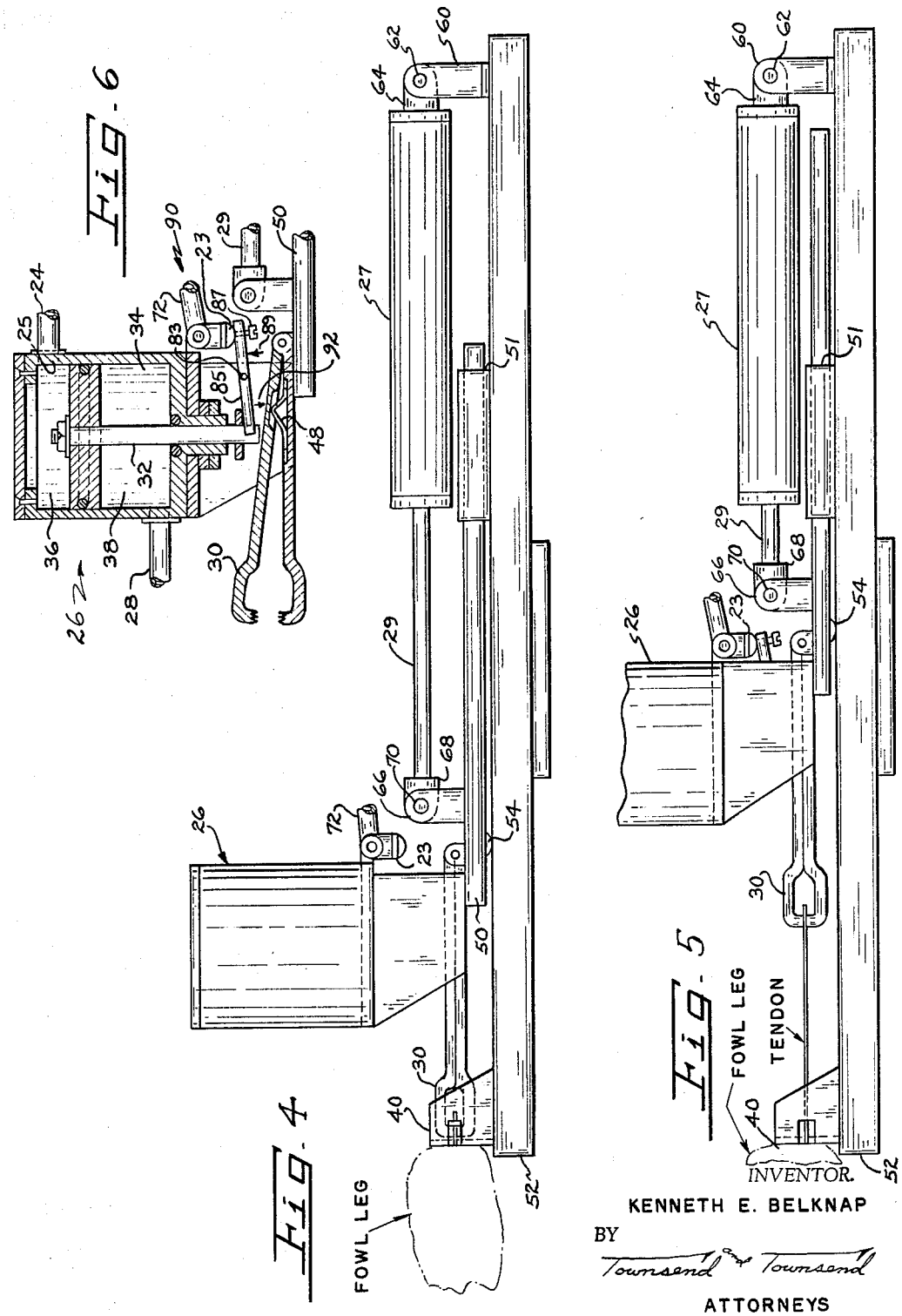

United States Patent Office 3,277,516
Patented Oct. 11, 1966

3,277,516
FOWL TENDON PULLING MACHINE
Kenneth E. Belknap, Dinuba, Calif., assignor to Hydra-hone Equipment Division, John Mohr & Sons, Milwaukee, Wis.
Filed Nov. 4, 1964, Ser. No. 408,978
4 Claims. (Cl. 17—11.3)

This invention relates to fowl preparation machines and particularly to a tendon puller apparatus for the preparation of fowl such as turkeys for market.

In order to make fowl, such as turkeys, more suitable for commercial marketing, it has been found advisable to remove the tendons from the legs. The tendons above the hock joint are particularly difficult to remove, and to my knowledge no feasible system has heretofore been developed to effect removal of such tendons after the legs have been cut off at the hock joint.

Some tendon pulling machines disclosed in the prior art remove the tendons prior to severing the legs at the hock joint. These machines, however, utilize the feet of the fowl to pull the tendons from the legs because the tendons in the bird's leg are strongly anchored at the feet. However, the feet of the fowl are dirt and germ carriers and thus strong objections have been made to processing methods which utilize the bird's feet in tendon pulling operations because the high probability of contamination of the rest of the bird ensuing from such methods.

A practical method to avoid such contamination is to cut off the feet of the fowl immediately after the bird has been killed and, as it is customary, prior to washing the bird. In some instances, as indicated by business conditions, the bird is stored in a freezer after the feet have been cut off and the bird has been washed but before the tendons are removed.

The tendon pulling or tendon removing operation is subsequently performed, in conjunction with other required customary operations, when the customer's orders have been received. If the bird has been stored in a freezer then the tendon removal is performed after the meat has been properly thawed. The method thus outlined permits the performance of the tendon pulling operation in a room separate from the place or room where the fowl is cleaned, which in turn decreases even further the probability of contamination of the rest of the meat.

The apparatuses disclosed in the prior art, however, are relatively incapable of proper operation in a system as described above because the tendon pulling operation is dependent on the pulling of the feet of the fowl, which as described above is the anchor place of all the tendons in the legs.

Accordingly, it is an object of this invention to provide an improved tendon pulling apparatus which removes the tendons from the fowl (including the portion of the leg above the hock joint) after the feet of the fowl have been severed in a prior separate operation.

It is another object of this invention to provide a tendon removing machine for fowl preparation which removes the tendons from the fowl's legs by directly exercising a pulling force on the tendons without utilizing the feet of the bird as a means for pulling the tendons from the legs.

Other objects of the invention will appear hereinafter in connection with the following detailed discussion of an embodiment of the invention as illustrated in the accompanying drawings wherein:

FIGURE 1 is a plan view of a tendon pulling apparatus embodying the invention;

FIGURE 2 is an enlarged fragmentary side elevation taken along lines 2—2 shown in FIGURE 1;

FIGURE 3 is an enlarged partial front elevation taken along line 3—3 shown in FIGURE 2;

FIGURE 4 is a side view of the tendon pulling machine shown in a first position of operation, i.e., at the beginning of a tendon pulling operation;

FIGURE 5 is a side view of the tendon pulling apparatus shown in FIGURE 4 in a second position of operation, i.e., immediately before the tendon pulling operation is completed; and FIGURE 6 is a cross sectional side view of the forward portion of the apparatus as illustrated in FIGURES 4 and 5, but with the tendon pulling jaws 30 in open position, and before the pedal 12, shown in FIGURE 1, is activated.

Reference is now made to FIGURE 1 of the drawings which shows a fowl tendon removing machine 10 embodying the invention.

The machine is operated by stepping on a foot pedal 12, which actuates a pressure valve 14. The pressure valve 14 is supplied from a compressed air supply tank 16 connected to valve 14 by means of pipe or air hose 22. A conventional pressure reducer 20, of the type providing downstream air in the range of 75 to 150 p.s.i. for example, is normally provided as shown.

The pressure valve 14 may be a four-way valve used to control double acting cylinders, such as cylinder 27, and having the required number of ports. The valve 14 is connected through a pipe or air hose 24 to the port 25 of cylinder 34 (shown in more detail in FIGURE 6) to actuate the cylinder 34 on its down stroke when the pedal 12 is depressed, and as it will be described later on.

In addition, the valve 14 is connected to the valve cylinder assembly 26 through a portion of air exhaust hose 28. The assembly 26 is shown in FIGURE 6 in a position corresponding to the time before the operation is begun. As shown in FIGURE 6, the assembly 26 includes a piston rod 32 movable within the cylinder 34 in a vertical direction. The direction of the motion of rod 32 is a function of the difference in pressure between chambers 36 and 38, and which is controlled by the valve 14. As shown in FIGURE 1, valve 14 is actuated by the foot pedal 12, which couples the air through air hoses 24 and 28.

A downward motion of piston rod 32 exhausts air through pipe 28 and closes the jaws 30, thereby clamping the tendons to be removed before the actual pulling operation. The clamping action continues until the jaws 30 are moved to a second position away from the leg of the fowl, when a change in the relative pressure of chambers 36 and 38 move the piston rod upward and the jaws 30 are opened. Under these circumstances, air is exhausted from chamber 36.

Before engaging the pedal 12, the operator places the legs of a fowl, such as turkey legs for example, in the leg supporting means shown in FIGURE 3 comprising a flat plate 40 formed with a transverse slot 41, wherein the turkey leg is inserted. The slot 41 may be tapered to permit processing legs of birds of different dimensions such as turkeys and chickens, for example.

In addition, the surfaces of the jaws 30 making contact with the tendons are formed with serrations or knurled which when placed upon each other form a crisscross type pattern that cooperate to firmly clamp the tendons caught by the pair of jaws 30. This feature ensures the tendons from slipping out of the jaws during the tendon pulling operation. Also, in order to increase the ruggedness of the support plate 40 either side plates 44 are added or a portion of the plate 40 is bent to form the sides 44 as indicated in FIGURE 2. To permit easy access of the jaws 30 to the tendons of the meat being prepared, the tendons extend through the slot 41 approximately one quarter of an inch. This has been found to be sufficiently long to permit the jaws 30 to firmly clamp the tendons and successfully pull the tendons out of the meat.

As previously described, the jaws 30 open and close as a function of the cylinder assembly 26. The lower one of the pair of jaws 30 is stationary with respect to any vertical motion, but the upper jaw 30 moves downward to close over the tendon as a function of the pressure exerted by the piston rod 32. When the piston rod 32, however, is moved upward, so that no pressure is exerted upon the upper jaw 30, a leaf spring 48 exerts pressure on the upper jaw 30 returning it to its normal position, which in turn releases the tendon. The pressure exerted by the piston rod 32, hence, exceeds the pressure constantly being exerted on the upper jaw 30 by spring 48 during the clamping operation.

As illustrated in FIGURES 1, 4 and 5, the pair of jaws 30 and cylinder 26 are mounted on a carriage 50 which includes a pair of slides and which runs on a track 52 by means of wheels 54. The carriage 50 is supported and directed by guide support 51, which includes a support corresponding to each of the slides. Each support is located at a convenient distance from the plate 40 on the track 52 to permit free motion of the carriage 50 on the track. The carriage 50, and hence the jaw-cylinder assembly 26, is moved forwards and backwards with respect to the plate 40 by means of cylinder 27, and more specifically by the piston rod 29.

The cylinder 27 is pin-connected (pin 62) at tongue 64 to bracket 60. The bracket 60 is in turn mounted on track or base support 52. Motion of the assembly 26 is accomplished by means of rod 29, which extends through the other end of cylinder 27, and which is pin-connected to bracket 66. Bracket 66 is in turn mounted on a plate 97 extending between the slides of carriage 50, as illustrated in FIGURE 1.

Also as illustrated in FIGURE 1, the cylinder 34 is connected through an air hose 72 to a conventional pilot valve 74, in turn connected to a pressure valve 76, to control the motion of cylinder 27 through check (flow control) valves 78 and 80. The pressure valve 76 is also coupled to the supply 16 as shown. Ports 82 and 84 provide the connection between air hoses 81 and 79 and cylinder 27 respectively.

In operation, after the fowl to be prepared is killed, the feet are cut off and the remaining meat is washed and stored. Subsequently, the meat is prepared for shipment or for market. To that end, the leg of the fowl is slid into the slot of plate 40; the tendons being placed facing the jaws 30, and the machine is ready to begin the operation. The starting position is illustrated in FIGURE 6 or the jaws 30. At the starting position, piston rod 29 is completely extended outside of cylinder 27, and piston rod 32 is at the end of its up stroke. Consequently, the jaws 30 are open, and the rocker arm assembly 90 has rocker arm 85 pivoted around pin 83 in the direction opposite to the rotation indicated by arrows 89 and 92.

When the operator steps on foot pedal 12, the tendon pulling operation is begun. Stepping on pedal 12 activates cylinder 34 whereby the piston rod 32 starts its downward motion, closing the jaws 30 which in the starting position are in close proximity to the plate 40 so that the tendons of the legs of the fowl extend between the jaws 30.

After the tendons are clamped by the jaws 30, the cylinder assembly 26 is moved in the backward direction away from the plate 40, due to the motion of piston rod 29 in such direction.

The motion of piston rod 29 is produced by the increase in pressure at port 82 which exceeds the pressure of the chamber (not shown) in contact with port 84. As the operator's foot presses down on foot pedal 12 and piston rod 32 moves downward, rocker arm 85, pivotally secured at one end of rod 32 is caused to rotate in the direction indicated by arrow 89. The adjusting screw 87, mounted at the other end of arm 85, and which is moved upward, operates bleeder valve 23 to bleed pressure off the chamber (not shown) of valve 76 to control the pressure differential in the valve spool and hence the air flow on cylinder 27, as is well known in the art.

When the back stroke of cylinder 27 terminates, and hence when the tendons of the leg of the fowl are removed, release of the operator's foot pedal opens the jaws 30 to permit the disposal of the severed tendons. The controlling pressure differential in the cylinder 34 is reversed by means of the valve spool (not shown) in pressure valve 14, whereby piston rod 32 begins its up stroke. The pivot lever or rocker arm 85 is hence rotated in the direction opposite to the direction indicated by arrow 92, thus moving adjusting screw 87 downward. The bleeder valve 76 thus reversed the air flow in cylinder 27 and the cylinder assembly 26 is moved back to its original position. That is, the air flow through air hose 81 is reversed and air through air hose 79 is exhausted.

It should be noted that the cylinder assembly 26 in close proximity to support plate 40 when the apparatus is in its original or starting position. FIGURE 4 illustrates the position of cylinder assembly 26 at the beginning of the operation, that is, right after pedal 12 has been depressed. As indicated in FIGURE 6, the pair of jaws 30 are open at the starting position of cylinder assembly 26 or at the time the cylinder assembly 26 has finished its backward motion, by pressure exerted by leaf spring 48 when the force exerted by piston rod 32 is withdrawn.

Although the foregoing invention has been described in some detail by way of illustration and example for purposes of clarity of understanding, it should be understood that certain changes and modifications may be practiced within the spirit of the invention as limited only by the scope of the appended claims.

What is claimed is:

1. In a fowl preparation machine for removing the tendons of a fowl's legs after the feet of said fowl have been severed from said legs, the improvement comprising in combination: a support mounted on a track, said support member forming a slot to hold the legs of the fowl to be prepared so that the cut tendons extend a predetermined length through said support; a puller member assembly movable from a first position to a second position on said track, said assembly including a pair of jaws to clamp said tendons, and control means to open and to close said jaws at predetermined times; means including a cylinder assembly mounted on said track to impart motion to said puller assembly, and means for synchronizing the operation of said cylinder assembly and said puller member assembly so that when said jaws are closed by said control means said cylinder assembly is moved to said second position at which time said control means opens said jaws, and after said jaws are opened said cylinder assembly is moved back to said first position.

2. In a fowl preparation machine for removing the tendons of a fowl's legs after the feet of said fowl have been cut off, the improvement comprising in combination: a support plate for receiving the legs of said fowl, said support plate forming a tapered slot to support firmly said legs, the tendons of said legs being inserted through said slot to extend a predetermined distance from said plate; a normally open pair of jaws for clamping said tendons; first cylinder means including a piston rod mounted in cooperation with said jaws to control the position of each of said pair of jaws with respect to each other; second cylinder means, including a piston rod, mounted to impart forward and backward motions to said pair of jaws with respect to said support plate, and means for synchronizing the operations of said first and second cylinder so that when said jaws are closed said second cylinder means withdraws said jaws from contact with said support plate, when said second cylinder means terminates its backward motion said jaws are returned to their normal position; and when said jaws are opened said second cylinder means are activated to return said jaws to its original position.

3. In a fowl preparation machine for removing the tendons off the legs of said fowl after the feet of said fowl have been severed from said legs, the improvement comprising in combination: a support base; clamping means, for directly pulling on said tendons to remove said tendons off said legs, having first and second vertical positions and first and second horizontal positions, said clamping means being mounted to move on said support base between said first and second horizontal positions; vertical position control means mounted in cooperation with said clamping means to move said clamping means between said first and second vertical positions; horizontal position control means mounted in cooperation with said clamping means to move said clamping means between said first and second horizontal positions; and synchronizing means mounted in cooperation with said vertical and horizontal control means for actuating said horizontal position control means to move said clamping means from said first to said second horizontal positions when said clamping means are moved from said first to said second vertical positions, actuating said vertical control means to move back said clamping means to said first vertical position when said clamping means reaches said second horizontal position, and actuating said horizontal control means to move said clamping means to said first horizontal position when said clamping means has returned to said first vertical position.

4. A machine for removing the tendons off the legs of a fowl after the feet of said fowl have been severed from said legs, the improvement comprising in combination: a track, a perforate support plate fixedly mounted on said track to hold the leg of said fowl to be prepared so that said tendons extend predetermined lengths through said support plate; a pair of jaws mounted on said track to move from a first position to a second position, one of said jaws being movable with respect to the other of said jaws from a first vertical position away from said other jaw to a second vertical position in close contact with said other jaw to clamp on said tendons, a cylinder assembly including a piston rod mounted in cooperation with said one jaw to move said one jaw between said first and second vertical positions, and means mounted on said track in cooperation with said jaws to move said jaws from said first horizontal position to said second horizontal position after said one jaw is moved to said second vertical position.

References Cited by the Examiner

UNITED STATES PATENTS

| | | | |
|---|---|---|---|
| 2,689,371 | 9/1954 | MacDonald | 17—11.3 |
| 2,694,219 | 11/1954 | Mayer | 17—11.3 |
| 2,739,346 | 3/1956 | Martin et al. | 17—11.3 |

SAMUEL KOREN, *Primary Examiner.*

LUCIE H. LAUDENSLAGER, *Examiner.*